Patented Oct. 8, 1929

1,730,773

UNITED STATES PATENT OFFICE

JAMES L. LANDER AND GEORGE N. WHITE, OF OAKLAND, CALIFORNIA

STROP HONING PASTE

No Drawing. Application filed May 31, 1928. Serial No. 282,040.

The invention forming the subject matter of this invention relates to a composition for razor or other strops.

The primary object of the invention is the provision of a composition to be applied to the prepared surfaces, such as razor strop or razor stropping devices, for the purpose of increasing their efficiency during the honing or stropping of the razor or similar sharp-edged instruments and, at the same time, rendering the strops more pliable and productive of the best obtainable results.

Another object of this invention is the provision of a composition which may be easily and readily applied to the surface of a razor strop or stropping device for maintaining such strops in condition for immediate service and for permitting the operation of said strop more effectively and expeditiously than those in common use.

Other objects of the invention, together with the foregoing, will be set forth in the following description of the preferred proportions of the ingredients in the composition and of the preferred mode of mixing the ingredients. Although we describe the best mode in which we contemplate embodying our invention, we desire not to be limited to the details of such disclosure for in the further practical application of our invention, many changes in the proportion of the ingredients, in the form and in the process of mixing said ingredients may be made as circumstances require or experience suggests without departing from the spirit of the invention within the scope of the appended claims.

Our composition consists, substantially, of a mixture of extremely fine powdered mineral filler, such as powdered or pulverized carborundum and of India rouge for giving the necessary cutting or abrasive qualities; of an animal fat and parowax for holding the powder in the interstices of the material, and of white paraffine oil for softening and rendering the strop more pliable.

In preparing the composition, we prefer to use the ingredients in about the following proportions: Best kidney fat 5 pounds, parowax 1 pound, white paraffine oil 1 pint, India (London) rouge 1 pound, S. S. S. carborundum ⅓ pound.

The ingredients are to be thoroughly mixed in the following order. First, the required amount of kidney fat is rendered and strained thoroughly. Then the parowax is added. The mixture of the fat and the parowax is allowed to come to a boil when the white paraffine oil and the India rouge are added and are thoroughly mixed by agitation, preferably by stirring. The mixture is allowed to come to a boil, and then the extremely fine carborundum is added. The whole mixture is stirred continuously while it is poured into molds.

The aforesaid mixture is most advantageously used as a razor strop honing paste.

While the use of kidney fat and the paraffine oil reduces the powdered abrasive ingredients to the cream or paste form, the parowax reduces the ingredients to solid form or to any desired consistency, which may be obtained by varying the proportions of the different ingredients.

Having thus described our invention, what we now claim as novel and desire to secure by Letters Patent is:

1. A composition for razor strops or the like composed of animal fat, parowax, paraffine oil, India rouge, and finest carborundum.

2. A composition for razor strops or the like for honing purposes comprising approximately five pounds of kidney fat, one pound parowax, one pint white paraffine oil, one pound India rouge, and one-third pound of finest carborundum.

In testimony whereof we affix our signatures.

JAMES L. LANDER.
GEORGE N. WHITE.